March 8, 1932.　　　H. W. DOEBEL　　　1,848,245
NONCORROSIVE BATTERY TERMINAL POST
Filed June 7, 1928
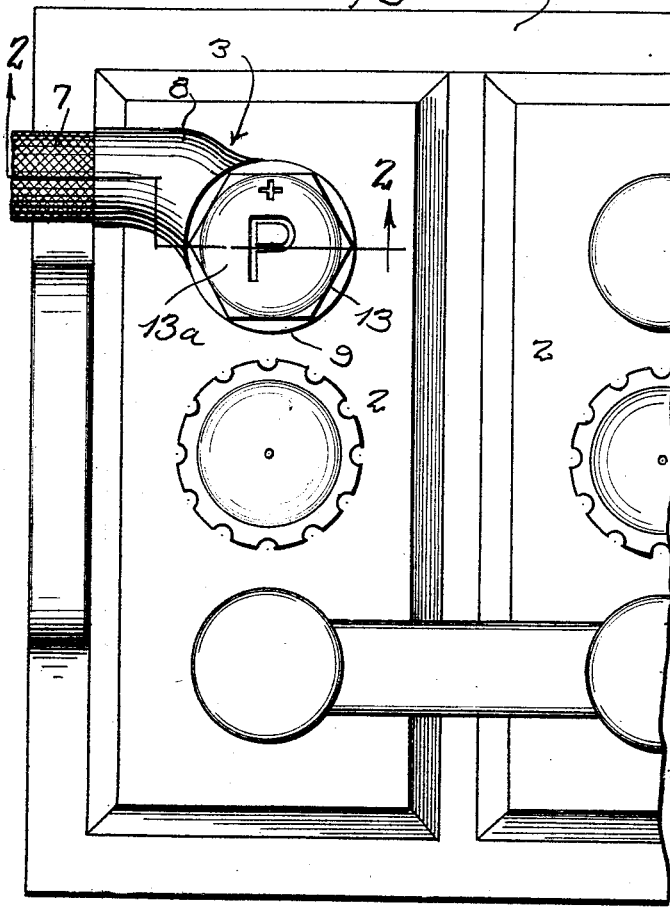
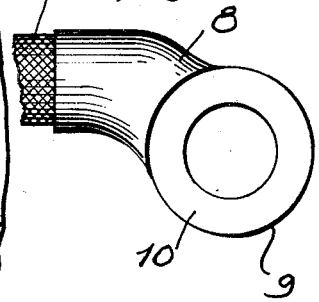
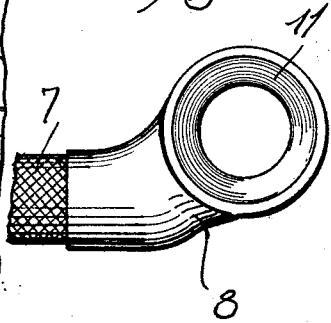
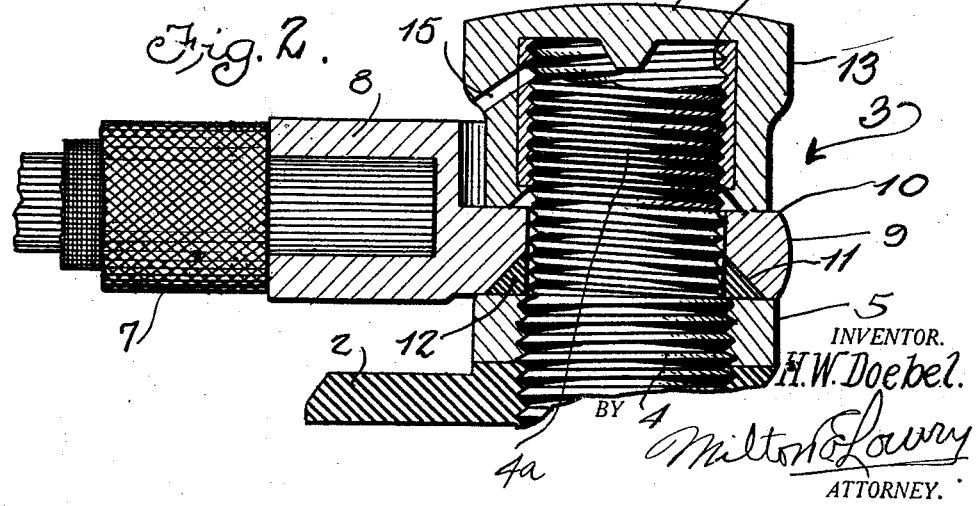
INVENTOR.
H. W. Doebel.
BY Milton S. Lowry
ATTORNEY.

Patented Mar. 8, 1932

1,848,245

UNITED STATES PATENT OFFICE

HENRY W. DOEBEL, OF HANLONTOWN, IOWA

NONCORROSIVE BATTERY TERMINAL POST

Application filed June 7, 1928. Serial No. 283,638.

This invention relates to certain new and useful improvements in a non-corrosive battery terminal post for electric storage batteries, and has for its primary object to provide a battery terminal post assembly of a nature to eliminate growth of the corrosive substance usually occurring on the post head or terminal of the battery post.

A further object of the invention is to provide a non-corrosive terminal assembly for electric storage batteries wherein the post head and assembly are comprised substantially of lead, with the exception of a rubber gasket interposed between the battery post and ring of the terminal cable, and a brass threaded sleeve forming the inner face of a lead anchoring nut, the rubber gasket preventing the passage of sulphuric acid or fumes thereof to the interior of the nut, while a vent opening in the side wall of the nut to permit the escape of grease from the interior of the nut is closed by the escaping grease to protect the interior of the nut.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary top plan view of an electric storage battery embodying the positive terminal post of the present invention;

Figure 2 is an enlarged detail sectional view taken on line 2—2 of Figure 1; and Figures 3 and 4 are top and bottom plan views respectfully of the battery terminal cable.

The battery 1 comprises the usual cells 2 with the end conductors and filling openings, the end cell illustrated comprising the positive terminal generally designated by the reference numeral 3 and clearly shown in detail in Figure 2.

The terminal post assembly 3 comprises posts 4 extending upwardly above the cells 2 with the surface nuts 5 threaded on the posts 4 and bindingly engaged with the top wall of the cell 2 for rigidly supporting the post 4 and the post above the cell 2 is illustrated as threaded throughout its length as at 4a.

The terminal lead 7 of the battery post assembly 3 comprises a cable carrying a head having a socket 8 into which one end of the cable lead 7 is anchored and a ring 9 on the head 8. The ring 9 has a flat or plain upper side 10 and an upwardly tapering lower side 11 that faces the nut 5. A rubber gasket 12 is mounted upon the post 4 in surrounding relation to the intermediate portion thereof and in contact with the nut 5, the ring 9 being moved into engagement with the gasket 12 with the latter received in the triangular recess formed by the tapered bottom space 11 of the ring 9.

The battery terminal assembly further includes a retaining nut for the ring 9 of the terminal lead, the nut 13 having a sleeve lining 14 that is internally threaded to be received on the upper threaded end 4a of the post 4. A lateral port 15 is formed in the nut and extends through the body of the nut 13 adjacent its outer end 13a and also the sleeve lining 14. The terminal assembly is practically formed of all lead with the exception of the rubber gasket 12 and the sleeve lining 14 of the nut 13, the better to form a connection between the terminal lead and the battery post. The threading of the nut 13 upon the post end 4a moves the same into binding engagement with the ring 9 and forces the latter into intimate contact with the rubber gasket 12. Before the nut 13 is applied to the post 4, the same is filled with a grease or other lubricant and excess grease collecting in the closed head of the nut escapes through the side opening 15 and when the nut is completely screwed home, a charge of grease remains in the opening 15 and seals the interior of the nut against the atmosphere. The post is non-corrosive as the same is practically lead coated and sulphuric acid or fumes thereof cannot reach the post.

While there is herein shown and described the preferred embodiment of the invention, it is nevertheless to be understood that minor changes may be made therein without departing from the spirit and scope of the invention as claimed.

What I claim as new is:—

In a non-corrosive battery terminal post, a terminal post having an exposed portion externally threaded, a binding nut threaded on the lower end of the post, a terminal cable with a rabbeted ring head inclosing an intermediate portion of the post, and a cap nut of relatively soft metal having a tubular sleeve lining of relatively hard metal with the tubular lining internally threaded for engagement with the threaded terminal post, said tubular lining terminating at its outer end in engagement with the inner face of the head of the cap nut and the inner end of the tubular lining terminating at a point adjacent the inner open end of the cap nut and engaged by a portion of the inner wall of the cap nut, and the inner wall of the cap nut being beveled outwardly at a point inwardly of the tubular lining and adjacent the rabbeted head of the terminal cable.

In testimony whereof I affix my signature.

HENRY W. DOEBEL.